United States Patent [19]

Toyoda et al.

[11] Patent Number: 5,110,352

[45] Date of Patent: May 5, 1992

[54] METHOD OF PRODUCING ALUMINUM MATERIAL FOR USE AS ELECTRONIC MATERIAL

[75] Inventors: Kazuo Toyoda; Masao Maeda, both of Osaka, Japan

[73] Assignee: Showa Aluminum Corporation, Osaka, Japan

[21] Appl. No.: 705,422

[22] Filed: May 24, 1991

[30] Foreign Application Priority Data

May 28, 1990 [JP] Japan .................................. 2-137977

[51] Int. Cl.[5] ............................................. C22B 21/06
[52] U.S. Cl. ..................................... 75/679; 75/10.11
[58] Field of Search ............................... 75/679, 10.11

[56] References Cited

FOREIGN PATENT DOCUMENTS 375308  6/1990  European Pat. Off. ........... 75/10.11
251264  11/1987 Fed. Rep. of Germany ..... 75/10.11
82437   5/1982  Japan .................................. 75/679

Primary Examiner—Melvyn J. Andrews
Attorney, Agent, or Firm—Armstrong, Nikaido, Marmelstein, Kubovcik & Murray

[57] ABSTRACT

An aluminum material for use as an electronic material is produced by a method comprising the steps of melting aluminum inevitably containing U and Th to obtain molten aluminum, holding the molten aluminum heated at a temperature above the solidification temperature thereof, and immersing a hollow rotary cooling member in the molten aluminum and rotating the cooling member in the molten aluminum while maintaining the surface of the cooling member at a temperature lower than the solidification temperature by supplying a cooling fluid to the interior of the cooling member to cause aluminum to crystallize out on the surface of the cooling member with reduced U and Th contents.

2 Claims, 1 Drawing Sheet

_METHOD OF PRODUCING ALUMINUM MATERIAL FOR USE AS ELECTRONIC MATERIAL_

BACKGROUND OF THE INVENTION

The present invention relates to a method of producing an aluminum material for use as an electronic material, for example, for use as a wiring material for high-density integrated circuits or as a material for bonding wires for connecting electrodes on IC chips to leads on external packages.

"ppb" as used herein is by weight.

Such bonding wires and wiring for LSIs, VLSIs and like high-density ICs are prepared from aluminum materials such as high-purity aluminum, Al-Si alloy, Al-Si-Cu alloy and Al-Cu alloy. Among these aluminum materials, the high-purity aluminum heretofore used is prepared by the three-layer electrolytic purification process. The other aluminum alloys in use are prepared by adding alloy components to the high-purity aluminum obtained by the above process.

However, the three-layer electrolytic purification process involves extreme difficulties in reducing the U and Th contents of aluminum owing to contamination, so that the high-purity aluminum obtained by this process usually inevitably contains about 20 to about 300 ppb of U and Th. Consequently, U and Th are present in the bonding wires and IC wiring which are made of the high-purity aluminum or the aluminum alloy prepared from the high-purity aluminum. A problem is therefore encountered in that the radioactive emissions released form U and Th, especially alpha rays, produce software errors in integrated circuits.

Accordingly, processes have been proposed for reducing the U and Th contents of aluminum materials to diminish such software errors. The first of these processes is a strip melting process (see Unexamined Japanese Patent Publications SHO 61-59761 and 61-59760).

The second of these processes comprises the steps of evaporating the aluminum material to be purified and containing U and Th within a vacuum container, ionizing the evaporated aluminum material, applying a magnetic field to the ionized aluminum material to change the impurity concentration of the material, and separately collecting a portion of the aluminum material having an increased impurity concentration and a portion of the material having a decreased impurity concentration (see Unexamined Japanese Patent Publication SHO 57-164942).

The first process must be practiced in a sustained equilibrated state, requires a long period of time and is industrially very costly. The second process is extremely low in the purification efficiency achieved by one operation as disclosed in the publication, needs to be practiced repeatedly many times and is also industrially very costly.

SUMMARY OF THE INVENTION

An object of the present invention is to provide a method of producing an aluminum material for use as an electronic material free from the above problems.

The present invention provides a method of producing an aluminum material for use as an electronic material comprising the steps of melting aluminum inevitably containing U and Th to obtain molten aluminum, holding the molten aluminum heated at a temperature above the solidification temperature thereof, and immersing a hollow rotary cooling member in the molten aluminum and rotating the cooling member in the molten aluminum while maintaining the surface of the cooling member at a temperature lower than the solidification temperature by supplying a cooling fluid to the interior of the cooling member to cause aluminum to crystallize out on the surface of the cooling member with reduced U and Th contents.

A block of high-purity aluminum having reduced U and Th contents can be formed by the method of the invention easily within a short period of time. The aluminum is therefore available industrially at a lower cost. The high-purity aluminum can be formed in this way for the following reason. When the cooling member is rotated as immersed in molten aluminum containing U and Th and held heated at a temperature above the solidification temperature of the aluminum while maintaining the surface of the cooling member at a temperature lower than the solidification temperature by supplying a cooling fluid to the interior of the member, primary crystals of high-purity aluminum first separate out on the peripheral surface of the cooling member on the principle of segregation as is the case with the conventional strip melting process, and high-purity aluminum further crystallizes out with the progress of solidification. When the aluminum crystallizes out, U and Th are released into the liquid phase, forming a layer of concentrated impurities, i.e., of concentrated U and Th, in the vicinity of the solid-liquid interface, whereas since the cooling member is in rotation, the molten aluminum flows in the same direction as the rotation of the cooling member, whereby U and Th, each having a great mass number, are centrifugally moved away from the periphery of the cooling member. As a result, the concentrated impurity layer formed in the liquid phase in the vicinity of the cooling member becomes thin, and the U and Th concentrations decrease. The aluminum crystallizing out on the cooling member periphery from this region therefore has greatly diminished U and Th contents.

The present invention will be described in greater detail with reference to the accompanying drawing.

DESCRIPTION OF THE PREFERRED EMBODIMENT

Figure 1:
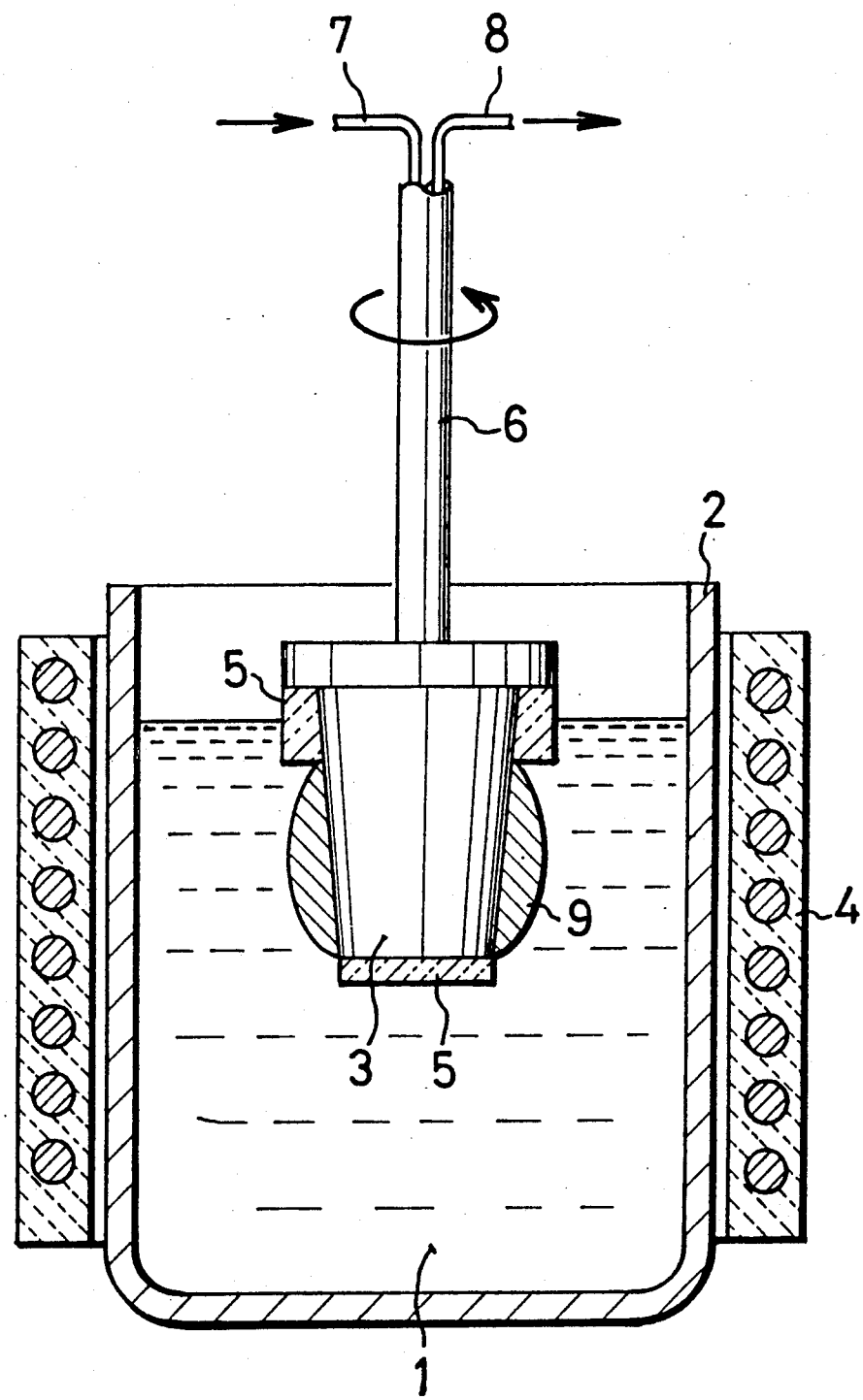
FIG. 1 is a view in vertical section showing an apparatus for practicing the method of the invention.

With reference to FIG. 1 showing an apparatus for producing an aluminum material for use as an electronic material by the method of the present invention, the apparatus comprises a crucible 2 for holding therein molten aluminum 1 inevitably containing U and Th, and a hollow rotary cooling member 3 placed in the crucible 2.

The crucible 2 is made of a material which is not reactive with the molten aluminum 1 and which will not contaminate the aluminum 1. For example, it is made of graphite or a ceramic material. The crucible 2 is provided therearound with a heater 4 for holding the molten aluminum 1 in the crucible 2 heated at a temperature above the solidification temperature of the aluminum 1.

The hollow rotary cooling member 3 is in the form of a downwardly tapered cylinder having a diameter which is largest at its upper end and gradually decreases downward. When the cooling member 3 is in the form of a downwardly tapered cylinder, a block of high-purity aluminum separating out on the outer peripheral surface of the cooling member 3 can be readily removed from the member 3 as by downward mechanical scraping for the collection of the aluminum. The cooling member 3 is made of a heat-resistant material, such as graphite or ceramic, having high heat conductivity, not reactive with the molten aluminum 1 and unlikely to contaminate the molten aluminum 1. Alternatively, the cooling member 3 comprises a body made of copper, iron or like metal of higher melting point than aluminum materials and covered with alumina or like material which has high heat resistance and which will not dissolve in and contaminate aluminum. The bottom of the cooling member 3 and the upper end of its periphery are covered with a heat-insulating material 5 having heat resistance, not reactive with the molten aluminum 1 and unlikely to contaminate the molten aluminum 1. When producing the aluminum material for use as an electronic material, the hollow rotary cooling member 3 is immersed in the molten aluminum 1, with the portion of heat-insulating material 5 around the upper end of its periphery positioned at the surface of the molten aluminum 1.

The cooling member 3 is attached to the lower end of a hollow vertical rotary shaft 6 which is movable upward and downward. A cooling fluid supply pipe 7 and a cooling fluid discharge pipe 8 extend through the rotary shaft 6 and communicate with the interior of the cooling member 3. The supply pipe 7 is connected to a cooling fluid supply device (not shown), and the discharge pipe 8 to a discharge device (not shown). Air, water, mist or like cooling fluid is sent into the cooling member 3 via the supply pipe 7 and discharged through the discharge pipe 8. The rotary shaft 6 is rotatable about a vertical axis by a drive device disposed above the crucible 2.

For treatment by the apparatus described above, aluminum inevitably containing U and Th is melted in a melting furnace (not shown) to obtain molten aluminum 1, which is then placed into the crucible 2 and held heated by the heater 4 to a temperature above the solidification temperature of the aluminum 1. The cooling member 3 is then rotated about the axis of the rotary shaft 6 at a peripheral speed of 1600 to 8000 mm/sec while passing the cooling fluid through the cooling member 3, whereby primary crystals of high-purity aluminum forming a smooth solidified surface are first separated out on the peripheral surface of the cooling member 3 on the principle of segregation. Further with the progress of solidification, a block of highpurity aluminum 9 crystallizes out. When the pure aluminum crystallizes out, U and Th are released into the liquid phase, forming a layer of concentrated impurities, i.e., of concentrated U and Th, in the vicinity of the liquid-solid interface. However, the rotation of the cooling member 3 causes the molten aluminum 1 to flow in the same direction as the rotation, whereby U and Th, each having a great mass number, are centrifugally moved away from the periphery of the cooling member 3. As a result, the concentrated impurity layer formed in the liquid phase in the vicinity of the cooling member 3 becomes thin, and the U and Th concentrations decrease. The aluminun crystallizing out on the cooling member periphery from this region therefore has greatly diminished U and Th contents. Nevertheless, the peripheral speed of the cooling member 3, if less than the lower limit, fails to make the thickness of the concentrated impurity layer sufficiently small, whereas if the speed is above the upper limit, it becomes more difficult for the high-purity aluminum crystallizing out on the peripheral surface of the cooling member 3 to adhere to the peripheral surface with increasing centrifugal force to result in lower productivity. Preferably, therefore, the cooling member 3 is rotated at a peripheral speed of 1600 to 8000 mm/sec.

Furthermore, the smaller the velocity of crystallization of the high-purity aluminum on the peripheral surface of the cooling member 3, the better is the result. For this purpose, it is desired to diminish the difference between the quantity of heat to be supplied to the molten aluminum 1 by heating with the heater 4 and the quantity of heat to be removed from the molten aluminum 1 by the cooling member 3.

When the amount of high-purity aluminum block 9 formed on the periphery of the cooling member 3 has increased to a specific value, the rotation of the rotary shaft 6 and the cooling member 3 is discontinued to complete the operation. The cooling member 3 is thereafter withdrawn upward from the molten aluminum 1, and the high-purity aluminum block 9 is removed from the cooling member 3 for recovery by being mechanically scraped off the periphery of the member 3 downward or by being remelted. In this way, the high-purity aluminum material is produced for use as an electronic material.

The aluminum material of high purity thus produced is used as it is as an electronic material, or the aluminum material and a suitable alloy element or alloy elements are made into an alloy, such as Al-Si alloy, Al-Si-Cu alloy or Al-Cu alloy, which is used as an electronic material.

EXAMPLE 1

Molten aluminum 1 containing 110 ppb of U and 72 ppb of Th was placed into the crucible 2, and held heated by the heater 4 at 660° C. The cooling member 3, measuring 150 mm in the diameter of the covering of heat-insulating material 5 at the upper end of its periphery, was then rotated as immersed in the 20 molten aluminum 1 at a peripheral speed of 140 mm/sec for 10 minutes while supplying a cooling fluid to the interior of the cooling member 3 through the supply pipe 7. The rotation of the member 3 was then discontinued, and the cooling member 3 was raised. Consequently, a high-purity aluminum block 9 weighing 5 kg was formed on the peripheral surface of the cooling member 3. The aluminum block 9 was removed from the cooling member 3. The U and Th concentrations measured were 0.8 ppb U and 0.6 ppb Th.

What is claimed is:

1. A method of producing an aluminum material for use as an electronic material comprising the steps of melting aluminum inevitably containing U and Th to obtain molten aluminum, holding the molten aluminum heated at a temperature above the solidification temperature thereof, and immersing a hollow rotary cooling member in the molten aluminum and rotating the cooling member in the molten aluminum while maintaining the surface of the cooling member at a temperature lower than the solidification temperature by supplying a cooling fluid to the interior of the cooling member to cause aluminum to crystallize out on the surface of the cooling member with reduced U and Th contents.

2. A method as defined in claim 1 wherein the cooling member is rotated at a peripheral speed of 1600 to 8000 mm/sec.

* * * * *